United States Patent
Leff et al.

(10) Patent No.: US 11,245,639 B2
(45) Date of Patent: Feb. 8, 2022

(54) COMPOSITION OF PERSISTENT OBJECT INSTANCES LINKING RESOURCES ACROSS MULTIPLE, DISPARATE SYSTEMS

(71) Applicant: International Business Machines Corporation, Armonk, NY (US)

(72) Inventors: Avraham Leff, Spring Valley, NY (US); James T. Rayfield, Ridgefield, CT (US); Umut Topkara, Scarsdale, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 1910 days.

(21) Appl. No.: 14/475,875

(22) Filed: Sep. 3, 2014

(65) Prior Publication Data

US 2016/0065490 A1  Mar. 3, 2016

(51) Int. Cl.
*H04L 12/911*  (2013.01)
*G06F 9/54*  (2006.01)

(52) U.S. Cl.
CPC .............. *H04L 47/78* (2013.01); *G06F 9/541* (2013.01)

(58) Field of Classification Search
CPC . H04L 47/78; H04L 12/911; H04L 29/08144; H04L 29/06; H04L 29/08072; H04L 29/08171; H04L 12/5695; G06F 9/541; G06F 9/54
USPC ............. 709/226; 340/16.1; 710/36; 711/150
See application file for complete search history.

(56) References Cited

U.S. PATENT DOCUMENTS

| | | | |
|---|---|---|---|
| 5,298,786 A | 3/1994 | Shahidi et al. | 257/559 |
| 5,446,312 A | 8/1995 | Hsieh et al. | 257/559 |
| 6,763,356 B2 | 7/2004 | Borchers | |
| 7,170,112 B2 | 1/2007 | Ning | 257/197 |
| 7,285,454 B1 | 10/2007 | Liang et al. | 438/202 |
| 7,671,447 B2 | 3/2010 | Montree et al. | 257/565 |
| 8,022,506 B2 | 9/2011 | Ludikhuize | 257/592 |
| 8,335,792 B2 | 12/2012 | Britton et al. | |
| 2003/0088708 A1* | 5/2003 | Lewallen | G06F 9/4435 719/315 |
| 2004/0054690 A1* | 3/2004 | Hillerbrand | G06Q 10/06 |
| 2004/0084692 A1 | 5/2004 | Ning | 257/197 |
| 2006/0265508 A1* | 11/2006 | Angel | H04L 29/12047 709/230 |
| 2010/0070448 A1* | 3/2010 | Omoigui | H01L 27/1463 706/47 |
| 2010/0070515 A1* | 3/2010 | Dutton | G06F 17/30091 707/755 |
| 2011/0266630 A1 | 11/2011 | Suligoj et al. | 257/370 |
| 2012/0005263 A1 | 1/2012 | McWhirter et al. | |
| 2012/0235151 A1 | 9/2012 | Cai | 257/65 |

(Continued)

*Primary Examiner* — Tonia L Dollinger
*Assistant Examiner* — Mehulkumar J Shah
(74) *Attorney, Agent, or Firm* — Ido Tuchman; Daniel P. Morris

(57) ABSTRACT

A system, method and computer program product for composing persistent object instances that link resources across multiple, disparate systems. An example method includes associating resources with namespace-URLs and object instances. One of the namespace-URLs is designated as primary namespace-URL. A web-based object API is provided through which the object instance can be accessed. The web-based object API uses the primary namespace-URL as an identifier of the object instance.

20 Claims, 3 Drawing Sheets

(56) References Cited

U.S. PATENT DOCUMENTS

2014/0007178 A1* 1/2014 Gillum .................... G06F 21/00
726/1
2014/0201177 A1* 7/2014 Suryanarayan ... G06F 17/30194
707/705

* cited by examiner

COMPOSITION OF PERSISTENT OBJECT INSTANCES LINKING RESOURCES ACROSS MULTIPLE, DISPARATE SYSTEMS

BACKGROUND

The present invention relates to combining network resource features and, more specifically, to composing persistent object instances that link network resources across multiple, disparate systems of record (SoR) and systems of engagement (SoE).

SoRs are the enterprise resource planning (ERP)-type systems many organizations rely on to run their business. SoRs have rigorous correctness requirements so that extending the system involves large investments of time and other resources. SoRs typically evolve slowly, are often centralized, and are geared toward passively providing information to an organization's members.

By contrast, SoEs are typically more decentralized, evolve rapidly, encourage peer interactions, and often leverage cloud technologies to enable those interactions. SoEs focus on collaborative tools, such as email, wikis, blogs, chat, crowd-sourcing, web conferencing, video streams, video conferencing, and similar services.

It is often desirable to extend SoRs with new SoE features. This requires that the existing software and information management systems be extended to support the new features. However, SoRs can be difficult to extend because (a) they are sometimes written in relatively unpopular languages such as COBOL, (b) they sometimes use relatively unpopular databases such as IMS, and (c) the requirements for system correctness and reliability can be sufficiently strong as to make deployment of new features a slow process.

BRIEF SUMMARY

Accordingly, one example aspect of the present invention is a method for composing persistent object instances that link resources across multiple, disparate systems. The method includes associating each resource from a plurality of network-based resources with a namespace-URL. The namespace-URL includes a namespace and a resource uniform resource locator (URL). The namespace identifies a class of the network-based resources the resource belongs to. The resource URL provides a web-based resource application programming interface (API) through which the resource can be accessed. An associating step associates the network-based resources with an object instance. The method includes designating only one of the namespace-URLs of the network-based resources associated with the object instance as a primary namespace-URL such that the primary namespace-URL is not designated as the primary namespace-URL for any other object instance. A providing step provides a web-based object API through which the object instance can be accessed. The web-based object API uses the primary namespace-URL as an identifier of the object instance. An executing step executes the web-based object API using a computer processor.

Another example aspect of the present invention is a system for composing persistent object instances that link resources across multiple, disparate systems. The system includes a database managed by a database management system (DBMS). A composition server is configured to provide a web-based object API through which an object instance can be accessed. The web-based object API uses a primary namespace-URL as an identifier of the object instance. A computer processor is configured to associate in the database each resource from a plurality of network-based resources with a namespace-URL. The namespace-URL includes a namespace and a resource URL. The namespace identifies a class of the network-based resources the resource belongs to, and the resource URL provides a web-based resource API through which the resource can be accessed. The computer processor associates in the database the network-based resources with the object instance, and designates only one of the namespace-URLs of the network-based resources associated with the object instance as the primary namespace-URL such that the primary namespace-URL is not designated as the primary namespace-URL for any other object instance.

Yet another example aspect of the present invention is a computer program product for composing persistent object instances that link resources across multiple, disparate systems. The computer program product includes program code configured to: associate each resource from a plurality of network-based resources with a namespace-URL, associate the network-based resources with an object instance, designate only one of the namespace-URLs of the plurality of network-based resources associated with the object instance as a primary namespace-URL such that the primary namespace-URL is not designated as the primary namespace-URL for any other object instance, and provide a web-based object API through which the object instance can be accessed, the web-based object API using the primary namespace-URL as an identifier of the object instance.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
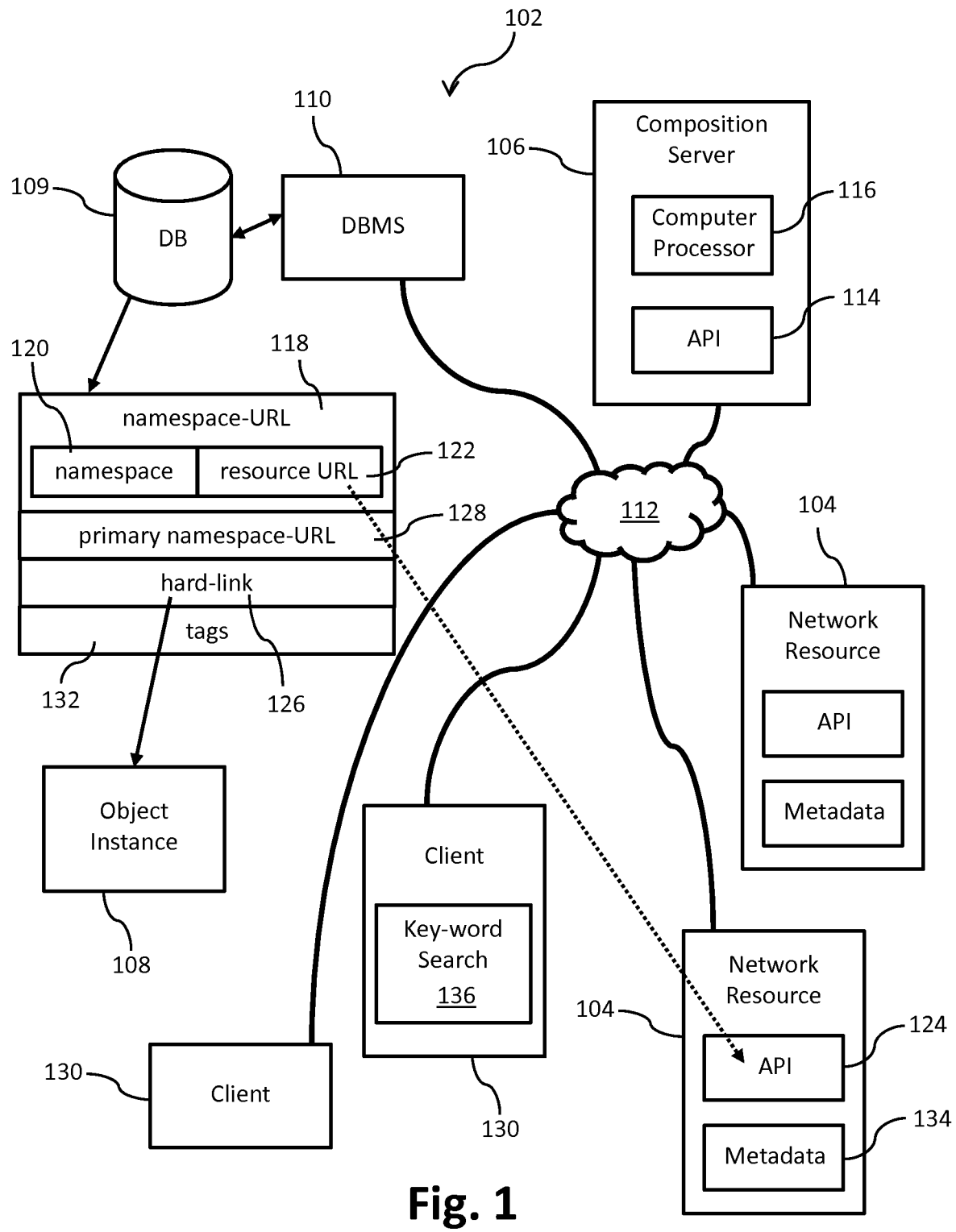
FIG. 1 illustrates an example system for composing persistent object instances that link resources across multiple, disparate systems in accordance with the present invention.

The present invention is described with reference to embodiments of the invention. Throughout the description of the invention reference is made to FIGS. 1-3. When referring to the figures, like structures and elements shown throughout are indicated with like reference numerals.

Embodiments of the present invention can enable data objects to be linked across disparate systems from different providers. For example, an embodiment may allow one to link a video hosted on YouTube™ to a tweet hosted on Twitter to a Tivoli work order hosted in an enterprise's private cloud.

Embodiments of the present invention do not require access to the database in which a resource exists. For example, a YouTube™ video may "exist" as one or more rows in one or more database tables on one or more different systems hosted by YouTube™. However, this resource is exposed as part of the YouTube API service as a REST endpoint URL. Embodiments of the present invention use this REST endpoint URL as the basis of linking the YouTube™ video to other resource objects. No access is needed to the underlying database tables in the YouTube™ system where the actual video metadata and data is kept. This approach differs from typical foreign key relationships in databases because foreign keys can only be resolved when they are accessed within the same logical database. Embodiments of the present invention do not create or assume a schema of any physical, logical, or federated database.

The resource URLs that comprise the sets that are used in embodiments of the present invention do not necessarily correspond to data that may be stored in a database. Consider a given resource such as the YouTube™ video which may have state that is not explicitly persisted in any database as a data type. Its state may be computed via business rules and other algorithms. Moreover, the web-based service APIs view the resource URLs as objects (containing methods/behaviors) rather than just data. When a REST or other HTTP method is invoked on a resource URL, we are not necessarily only involving database state since the service gets to interpose business logic rather than just assembling bits and bytes from a database system. This is true even for GET/POST, and even more true for other APIs in which we pass in a resource URL and the service performs some transformation that involves other data and business logic.

For example, the video service API may include more than just the video URL; it may include a specification for the QoS, or may even use analytics that are not even in the API to determine the QoS. In contrast to databases, where all we get to manipulate is the data, here via the service API we get to leverage the algorithms and analytics of the service provider. This is much more dynamic than a database-based approach since the service provider may improve the service over time.

FIG. 1 illustrates an example system 102 for composing persistent object instances that link resources across multiple, disparate systems in accordance with the present invention. The system 102 includes a plurality of network-based resources 104. A composition server 106 associates the resources 104 with an object instance 108. The system 102 further includes a database 109 managed by a database management system (DBMS) 110. The resources 104, server 106, and DBMS 110 are in communication via a computer network 112.

In one embodiment, the composition server 106 is configured to provide a web-based object API 114 through which the object instance 108 can be accessed. The composition server 106 includes a computer processor 116 that associates, in the database 109, each resource 104 with a namespace-URL 118. The namespace-URL 118 is composed of a namespace 120 and a resource uniform resource locator (URL) 122. As discussed in detail below, the namespace 120 identifies a class of the network-based resources that a particular resource 104 belongs to. The resource URL 122 points to a web-based resource application programming interface (API) 124 through which the resource 124 can be accessed.

The computer processor 116 associates the network-based resource 104 with the object instance 108 in the database 109 as follows. The computer processor 116 is further configured to assign a unique hard-link 126 to the object instance. In one embodiment, the hard-link 126 is a universally unique identifier (UUID). The computer processor 116 also associates the hard-link 126 to each resource 104 utilized by the object instance 108. Thus, each resource 104 utilized by the object instance 108 is associated to the same hard-link 126. Additionally, the computer processor 116 designates only one of the namespace-URLs 118 of the network-based resources 104 associated with the object instance 108 as a primary namespace-URL 128 such that the primary namespace-URL 128 is not designated as the primary namespace-URL 128 for any other object instance.

The web-based object API 114 uses the primary namespace-URL 128 as an identifier of the object instance 108. For example, the composition server 106 may return a listing of the network-based resources 104 associated with the object instance 108 to a client 130 upon a call to the web-based object API 114 that includes the primary namespace-URL 128. In one embodiment, the server is configured to create, retrieve, update and delete hard-links 126 via the web-based object API 114.

In one embodiment, the computer processor 116 is further configured to tag at least one of the network-based resources 104 with at least one tag 132 such that resources 104 with the same tag define a set themselves and object instances 108 associated with a resource 104 with a given tag 132 are implicitly linked to other resources with the same tag 132.

In one embodiment, the computer processor 116 is further configured to automatically associate at least one of the network-based resources 104 to the object instance 108 based on metadata 134 describing the resource 104. In a specific embodiment, the network-based resources are associated to the object instance based on the metadata describing the resource and a set of key-word search parameters 136 of the metadata 134.

The system 102 can address, for example, the difficulty of extending a SoR with new features through a scheme that links resources managed by the SoR with resources from other systems. The desired new features can then be provided through a combination of a) resources from new systems that may be written in modern languages, may use modern databases, and may have less rigorous correctness requirements and b) new business logic that manipulates the linked resources. This approach avoids the need to modify the SoR itself.

As mentioned above, each resource 104 (e.g., a video or a work-order) is associated with a namespace 120 (e.g., "YouTube" or "CSI Work-Orders") and an immutable resource URL 122 through which the resource can be accessed through a web-based API 124. The namespace 120 implies the semantics for how a resource 104 can be used as in a software plugin (e.g., display a video, or retrieve a work-order document in JSON format). Namespaces 120 are the mechanism by which a client 130 determines how to access and render data.

For example, a resource 104 with the namespace 120 of "YouTube" could signal a client 130 to use the YouTube API as part of the process of rendering a video on a device. A resource 104 with the namespace 120 of "CSI work-order" could signal a client 130 to use the CSI work-order API to render the work order, e.g., by following certain Open Services for Lifecycle Collaboration (OSLC, http://en.wikipedia.org/wiki/Open_Services_for_Lifecycle_Collaboration) link-references in the associated JSON document. The immutable resource URL 122 is a way of publishing the resource 104 as in linked-data (http://en.wikipedia.org/wiki/Linked_Data) schemes.

A namespace-URL 118 is defined as a duple consisting of a {namespace, immutable resource URL}. Namespace-URLs 118 are grouped into a type of set termed herein as a hard-link 126, which specify an object instance 108 composed from the capabilities or APIs of the constituent namespace-URL instances. Exactly one namespace-URL 118 in a given hard-link instance must belong to a primary namespace-URL 128. This primary namespace-URL requirement ensures that the object instance 108 has a unique identity through which it can be managed by application business logic. A primary namespace-URL 128 represents the hard-link instance with respect to the object instance 108, also referred to herein as a composition service.

With this terminology and these concepts in mind, the system 102 operates by:

1. Obtaining canonical immutable resource URLs 122 for each of the resources 104 that are to be linked with each other, where a resource URL 122 is associated with a given service provider (a namespace 120) that uses the address in web-based APIs 124, such as GET/PUT/POST HTTP REST APIs, or other richer web APIs;

2. Designating one of these namespace-URLs 118 as being the primary namespace-URL 128 to which other resources 104 are linked;

3. Enabling clients 130 to create a set relationship (a hard-link 126) between the primary namespace-URL 128 and the linked namespace-URLs 118 by internally assigning a unique identifier to the set of related resources;

4. Enabling clients 130 to retrieve the hard-link 126 by supplying the primary namespace-URL 128;

5. Enabling clients 130 to update the hard-link 126 by supplying the primary namespace-URL 128 and the namespace-URLs that are to be added to the hard-link 126;

6. Enabling clients 130 to delete an individual resource URL 122 by supplying the primary namespace-URL 128 and the namespace-URL 118 that is to be deleted from the hard-link 126; and 7. Enabling clients 130 to delete an entire hard-link 126 by supplying the primary namespace-URL 128 in a given hard-link 126.

Exemplary embodiments of systems and methods in accordance with the present invention provide for the creation of a type of set, termed a hard-link that defines a relationship between N resources from 1 or more web-services, and in which a given hard-link instance contains exactly one resource that is associated with a primary namespace-URL. A hard-link can be implemented as the set of {namespace, uuid, resourceURL} tuples that share the same uuid value. This enables an efficient implementation of persistent hard-links using a database that stores sets of these tuples.

Figure 2:
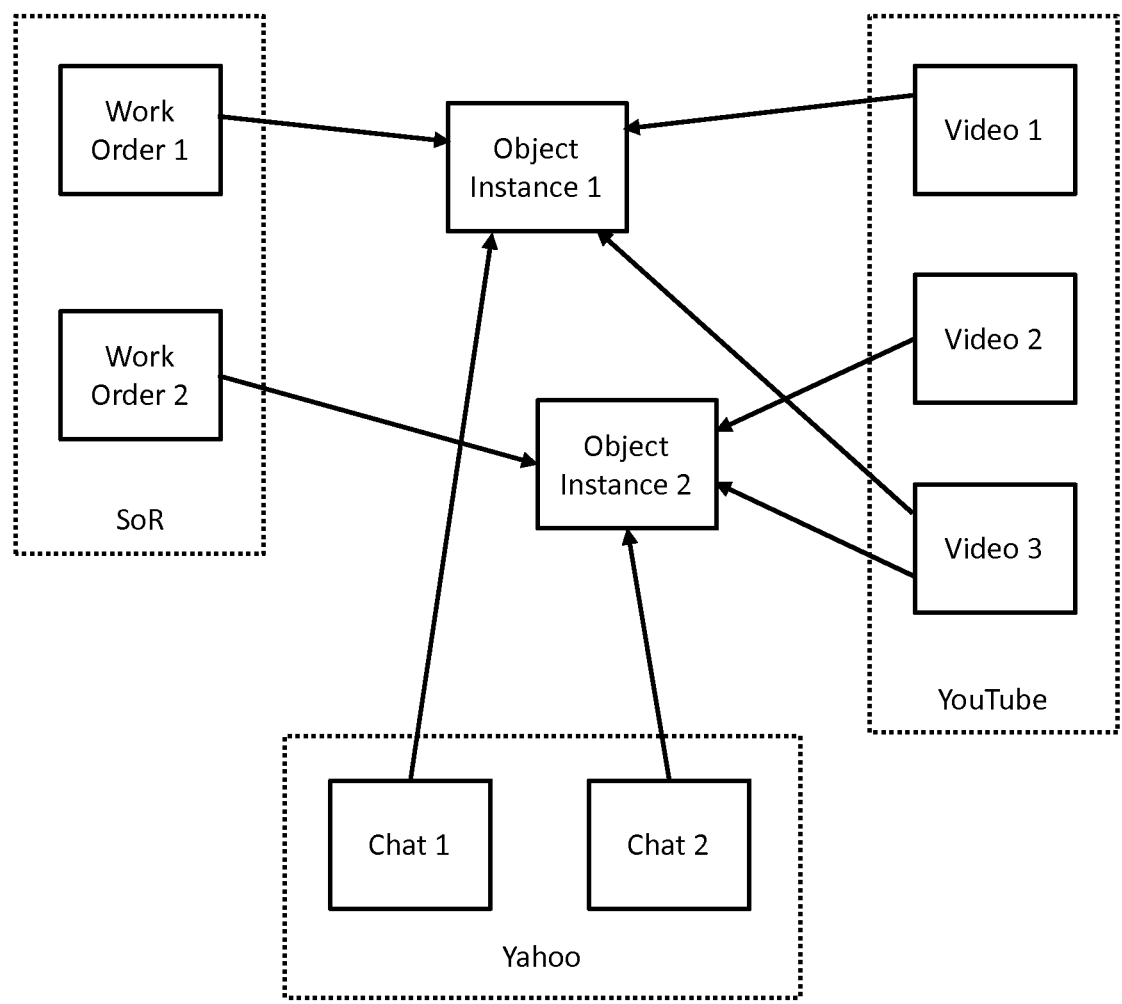
FIG. 2 illustrates sample SoR and SoE and associated resources to which an embodiment of the present invention adds the capability to create composed resources.

FIG. 2 is an illustration of sample SoR and SoE and associated resources to which an embodiment of the present invention adds the capability to create composed resources. The figure shows three base services: IBM CSI (Tivoli) which manages "work-order" resources Work Order 1 and Work Order 2 and is an example of a SoR, a chat service such as Yahoo™ chat rooms which manages Chat 1 and Chat 2, and a video service such as YouTube™ which manages Video 1, Video 2, and Video 3.

Resource instances from these base services are composed into composed Object Instance 1 and composed Object Instance 2. In this sample scenario, every work-order is associated with a single chat, and a work-order can be optionally associated with one or more relevant videos.

Table 1 below shows an embodiment of the two hard-links created in the example shown in FIG. 2. A database table is used with a schema {namespace, uuid, resourceURL} to store the links that are part of the managed hard-links, with the values of the uuid property defining the hard-link instances using the rule that all tuples sharing the same uuid property value belong to the same hard-link. In this example, UUDI X01 defines the hard-link {work-order WO 1, chat 1, video 1, video 3} and UUID X02 defines the hard-link {work-order WO 2, chat 2, video 2, video 3}. Note that M to N relationships are possible. For example, Video 3 is in both the X01 and X02 hard-links.

TABLE 1

Example Implementation of Persistent Hard-Links

| Namespace | UUID | Resource URL |
|---|---|---|
| work-order | X01 | http://maximo/1 |
| video | X01 | http://video/1 |
| work-order | X02 | http://maximo/2 |
| chat | X01 | http://chat/1 |
| chat | X02 | http://chat/2 |
| video | X02 | http://video/2 |
| video | X01 | http://video/3 |
| video | X02 | http://video/3 |

Figure 3:
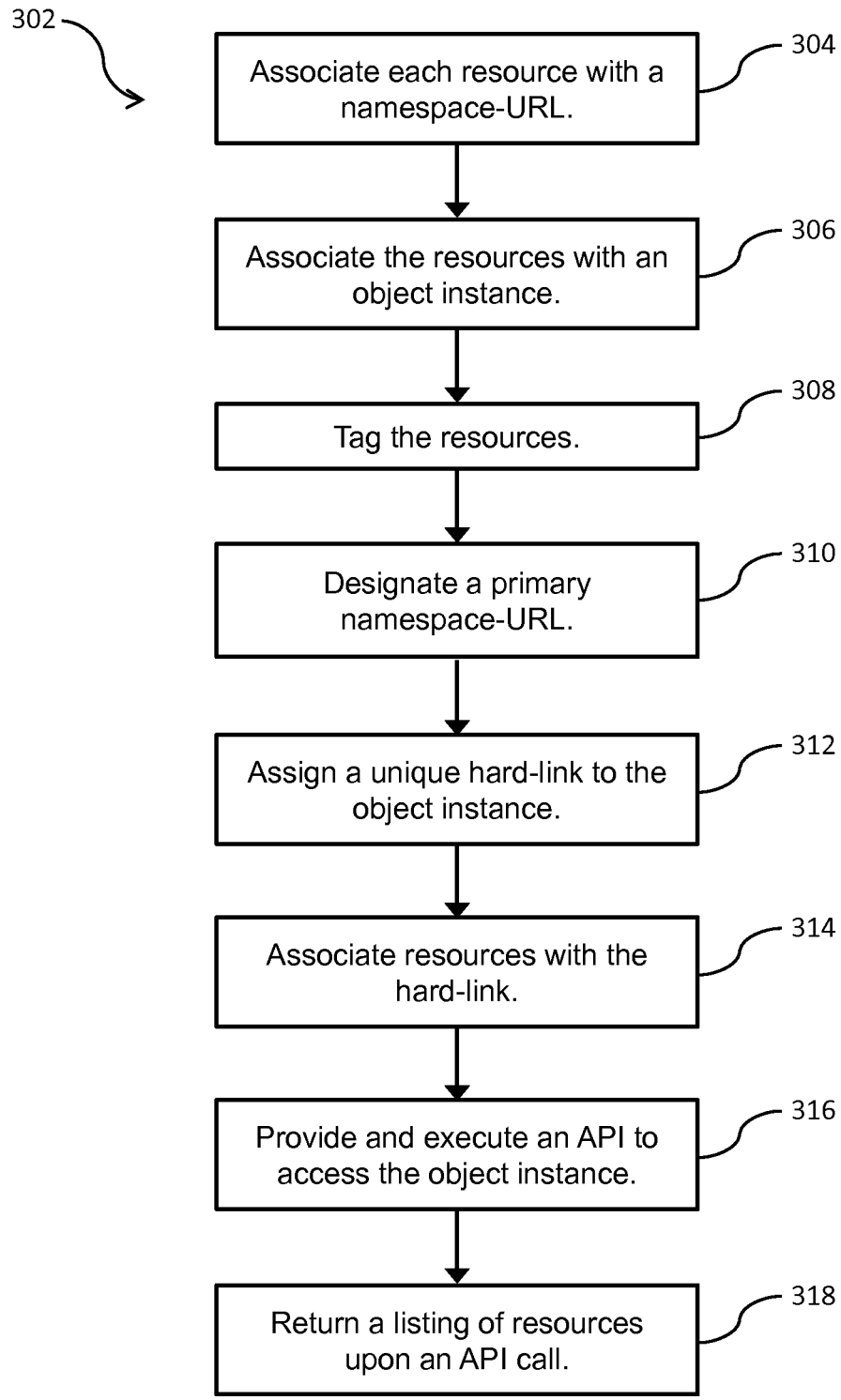
FIG. 3 shows an example flowchart for composing persistent object instances that link resources across multiple, disparate systems in accordance with an embodiment of the present invention.

FIG. 3 shows an example flowchart 302 for composing persistent object instances that link resources across multiple, disparate systems in accordance with an embodiment of the present invention. The process includes associating step 304 which associates each network-based resource with a namespace-URL. The namespace-URL includes a namespace and a resource URL. The namespace identifies a class of the network-based resources the resource belongs to. The resource URL provides a web-based resource API through which the resource can be accessed. After associating step 304 is completed, control flow passes to associating step 306.

At associating step 306, the network-based resources are associated with an object instance. In one embodiment, associating the network-based resources with an object instance includes automatically associating at least some of network-based resources to the object instance based on metadata describing the resource. In a further embodiment, automatic association is based on metadata describing the resource and a set of key-word search parameters of the metadata. After associating step 306 is completed, control flow passes to tagging step 308.

At tagging step 308, one or more of the network-based resources are tagged with at least one tag. Resources with the same tag value define a set themselves, and object instances associated with a resource with a given tag are implicitly linked to other resources with the same tag. After tagging step 308 is completed, control flow passes to designating step 310.

At designating step 310, one and only one of the namespace-URLs of the network-based resources is designated as a primary namespace-URL of the object instance. The primary namespace-URL is not designated as the primary namespace-URL of any other object instance. After designating step 310 is completed, control flow passes to assigning step 312.

At assigning step 312, a unique hard-link is assigned to the object instance. In one embodiment, the hard-link is a UUID. After assigning step 312 is completed, control flow passes to associating step 314.

At associating step 314, the hard-link is associated to each resource utilized by the object instance. Thus, each resource utilized by the object instance is associated to the same hard-link. After associating step 314 is completed, control flow passes to providing and executing step 316.

At providing and executing step 316, a web-based object API is provided and executed through which the object instance can be accessed. The web-based object API uses the primary namespace-URL as an identifier of the object instance. For example, at returning step 318, a listing of the network-based resources associated with the object instance is returned upon a call to the web-based object API. The call includes the primary namespace-URL as an identifier of the object instance.

The following illustrative API can be used to create a hard-link: POST hard_link[R1, R2, .... RN] where each R is a namespace-URL, N>=1, and exactly one of the resource parameters is associated with a primary namespace-URL, and the primary namespace-URL resource does not yet exist in any other hard-link.

The importance of the constraints regarding the primary namespace-URL has to do with the notion of the identity of a composed object instance. By analogy to the tuples of a relational database, typically a given tuple has exactly one primary key that distinguishes it from any other primary key in that table. Without a primary key, it is very difficult for application logic to retrieve the tuple, and with more than one primary key it becomes very difficult to modify the tuple since the modifications that make sense from the context of one primary key may not make sense (or will conflict) from the context of the other primary key since both are independent from one another. Embodiments of the present invention may similarly require that every composed object contain exactly one primary namespace-URL.

The following illustrative API can be used to retrieve a hard-link: GET hard_link[R0] where R0 is a primary namespace-URL. This API returns all namespace URLs associated with R0 if such a hard-link exists, and returns an error if no such hard-link exists. This API reflects the fact that typically applications will need to navigate to a hard-link using business logic (e.g., "I need work-order 42" or "Bank account associated with SSN X"). As with the tuples of a relational database, the most natural way to navigate to a given data entity is through its "identity" which corresponds to the primary namespace-URL.

The following illustrative API can be used to update a hard-link: PATCH[R0, R1] where R0 is a primary namespace-URL and R1 is a non-primary namespace-URL. The effect of this API invocation is that if R0 already exists, then R1 is added to the hard-link if it is not already in the hard-link. If R0 does not already exist, both R0 and R1 are added to a new hard-link.

The following illustrative API can be used to delete a namespace URL from a hard-link: DELETE[R0, R1] where R0 is a primary namespace-URL and R1 is a non-primary namespace-URL. The effect of this API invocation is that if R0 already exists, then R1 is removed from the hard-link if it is currently in the hard-link. Otherwise, an error is returned to the client.

The following illustrative API can be used to delete a hard-link: DELETE[R0] where R0 is a primary namespace-URL. The effect of this API invocation is that if a hard-link associated with R0 currently exists in the composition service, then the hard-link is deleted (the resources in the base services are not affected by the operation). Otherwise, an error is returned to the client.

It is contemplated that clients of the composition service exploit the business logic attached to namespaces to render a composed object, such as by displaying a video in a HTML5 video player or by formatting a work-order's JSON document in a custom GUI. In addition, clients can add business logic to the composition as a whole to enforce constraints on the relationships that exist among the resources in a hard-link instance or class of instances.

For example, an application may specify that for a given class of composed objects, work-order resources may be associated with exactly one resource from the chat namespace. When creating a new composed work-order, this rule is evaluated to invoke code that enforces this constraint. This code may exist on the server, e.g., as part of the composition service itself. Alternatively, it may exist on the client in the form of a client library that, for example, upon receiving a composed work-order object from the composition service that does not contain a chat, creates the chat, and adds it to the hard-link before proceeding with rendering the composed object on the device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for composing persistent object instances that link resources across multiple, disparate systems, the method comprising:
    associating each resource from a plurality of network-based resources with a namespace-URL, the namespace-URL including a namespace and a resource uniform resource locator (URL), the namespace identifying a class of the network-based resources the resource belongs to and the resource URL providing a web-based resource application programming interface (API) through which the resource can be accessed;
    associating the plurality of network-based resources with an object instance;
    designating only one of the namespace-URLs of the plurality of network-based resources associated with the object instance as a primary namespace-URL such that the primary namespace-URL is not designated as the primary namespace-URL for any other object instance;
    providing a web-based object API through which the object instance can be accessed, the web-based object API using the primary namespace-URL as an identifier of the object instance; and
    executing the web-based object API using a computer processor.

2. The method of claim 1, further comprising:
    assigning a unique hard-link to the object instance; and
    associating the hard-link to each resource utilized by the object instance such that each resource utilized by the object instance is associated to the same hard-link.

3. The method of claim 2, wherein the hard-link is a universally unique identifier (UUID).

4. The method of claim 1, further comprising returning a listing of the plurality of network-based resources associated with the object instance upon a call to the web-based object API, the call including the primary namespace-URL.

5. The method of claim 1, further comprising tagging at least one of the plurality of network-based resources with at least one tag such that resources with the same tag value define a set themselves and object instances associated with a resource with a given tag are implicitly linked to other resources with the same tag.

6. The method of claim 1, wherein associating the plurality of network-based resources with the object instance includes automatically associating at least one of the plurality of network-based resources to the object instance based on metadata describing the resource.

7. The method of claim 1, wherein associating the plurality of network-based resources with the object instance includes automatically associating at least one of the plurality of network-based resources to the object instance based on metadata describing the resource and a set of key-word search parameters of the metadata.

8. A system for composing persistent object instances that link resources across multiple, disparate systems, the method comprising:
 a database managed by a database management system (DBMS);
 a composition server configured to provide a web-based object API through which an object instance can be accessed, the web-based object API using a primary namespace-URL as an identifier of the object instance; and
 a computer processor configured to:
  associate in the database each resource from a plurality of network-based resources with a namespace-URL, the namespace-URL including a namespace and a resource uniform resource locator (URL), the namespace identifying a class of the network-based resources the resource belongs to and the resource URL providing a web-based resource application programming interface (API) through which the resource can be accessed;
  associate in the database the plurality of network-based resources with the object instance; and
  designate only one of the namespace-URLs of the plurality of network-based resources associated with the object instance as the primary namespace-URL such that the primary namespace-URL is not designated as the primary namespace-URL for any other object instance.

9. The system of claim 8, wherein the computer processor is further configured to:
 assign a unique hard-link to the object instance; and
 associate the hard-link to each resource utilized by the object instance such that each resource utilized by the object instance is associated to the same hard-link.

10. The system of claim 9, wherein the composition server is further configured to create, retrieve, update and delete the hard-link via the web-based object API.

11. The system of claim 8, wherein the composition server is further configured to return a listing of the plurality of network-based resources associated with the object instance upon a call to the web-based object API, the call including the primary namespace-URL.

12. The system of claim 8, wherein the computer processor is further configured to tag at least one of the plurality of network-based resources with at least one tag such that resources with the same tag value define a set themselves and object instances associated with a resource with a given tag are implicitly linked to other resources with the same tag.

13. The system of claim 8, wherein the computer processor is further configured to automatically associate at least one of the plurality of network-based resources to the object instance based on metadata describing the resource.

14. The system of claim 8, wherein the computer processor is further configured to automatically associate at least one of the plurality of network-based resources to the object instance based on metadata describing the resource and a set of key-word search parameters of the metadata.

15. A computer program product for composing persistent object instances that link resources across multiple, disparate systems, the computer program product comprising:
 a non-transitory computer readable storage medium having computer readable program code embodied therewith, the computer readable program code configured to:
 associate each resource from a plurality of network-based resources with a namespace-URL, the namespace-URL including a namespace and a resource uniform resource locator (URL), the namespace identifying a class of the network-based resources the resource belongs to and the resource URL providing a web-based resource application programming interface (API) through which the resource can be accessed;
 associate the plurality of network-based resources with an object instance;
 designate only one of the namespace-URLs of the plurality of network-based resources associated with the object instance as a primary namespace-URL such that the primary namespace-URL is not designated as the primary namespace-URL for any other object instance;
 provide a web-based object API through which the object instance can be accessed, the web-based object API using the primary namespace-URL as an identifier of the object instance.

16. The computer program product of claim 15, further comprising computer readable program code configured to:
 assign a unique hard-link to the object instance; and
 associate the hard-link to each resource utilized by the object instance such that each resource utilized by the object instance is associated to the same hard-link.

17. The computer program product of claim 15, further comprising computer readable program code configured to return a listing of the plurality of network-based resources associated with the object instance upon a call to the web-based object API, the call including the primary namespace-URL.

18. The computer program product of claim 15, further comprising computer readable program code configured to tag at least one of the plurality of network-based resources with at least one tag such that resources with the same tag value define a set themselves and object instances associated with a resource with a given tag are implicitly linked to other resources with the same tag.

19. The computer program product of claim 15, wherein the computer readable program code configured to associating the plurality of network-based resources with the object instance includes computer readable program code configured to automatically associate at least one of the plurality of network-based resources to the object instance based on metadata describing the resource.

20. The computer program product of claim 15, wherein the computer readable program code configured to associating the plurality of network-based resources with the object instance includes computer readable program code configured to automatically associate at least one of the plurality of network-based resources to the object instance based on metadata describing the resource and a set of key-word search parameters of the metadata.

* * * * *